March 1, 1938. F. J. OSIUS 2,109,501
DISINTEGRATING MIXER FOR PRODUCING FLUENT SUBSTANCES
Filed March 13, 1937 2 Sheets-Sheet 1
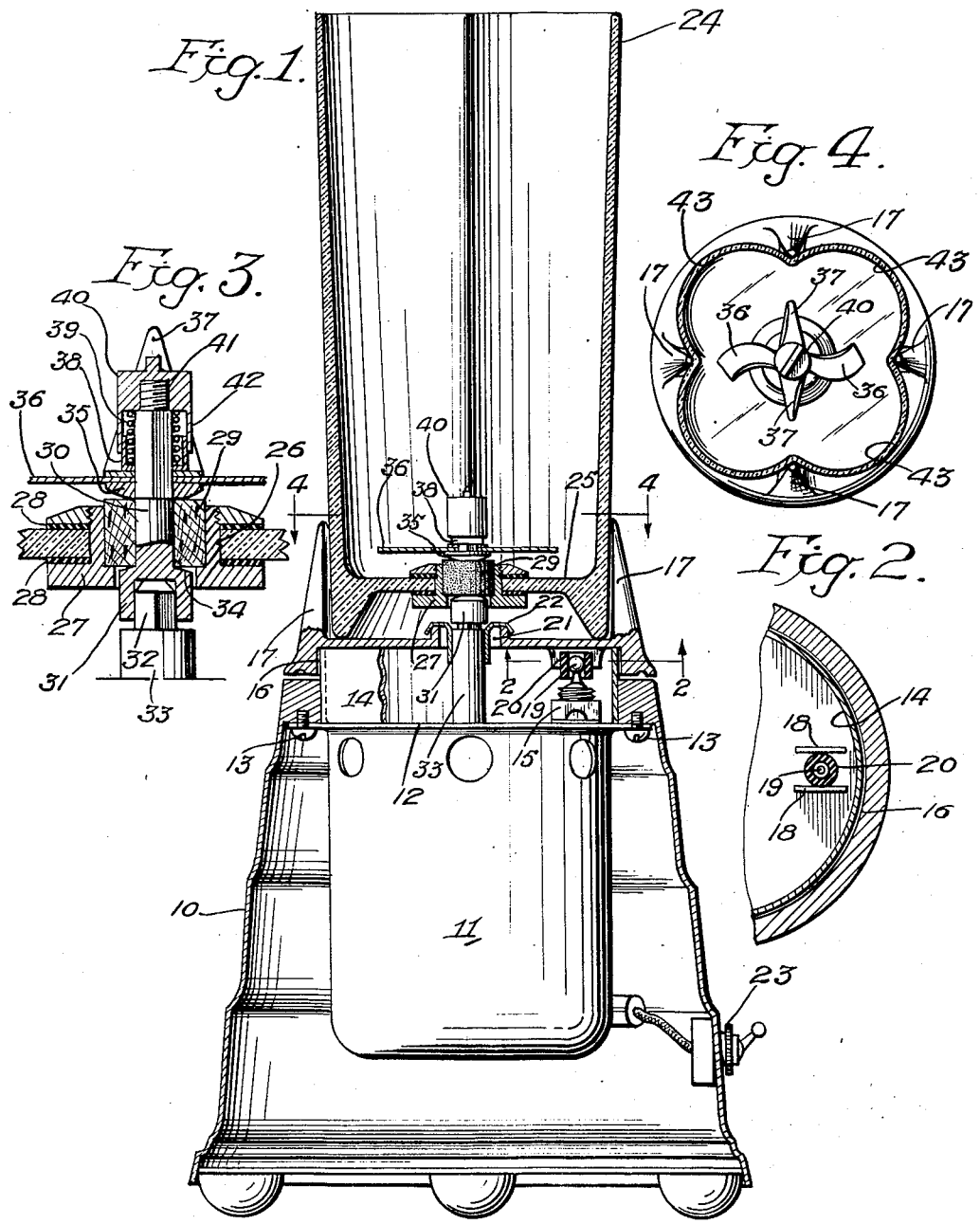
Inventor:
Frederick J. Osius
by his Attorneys
Howson & Howson March 1, 1938. F. J. OSIUS 2,109,501
DISINTEGRATING MIXER FOR PRODUCING FLUENT SUBSTANCES
Filed March 13, 1937 2 Sheets-Sheet 2

Inventor:—
Frederick J. Osius
by his attorneys
Howson & Howson

Patented Mar. 1, 1938

2,109,501

UNITED STATES PATENT OFFICE 2,109,501

DISINTEGRATING MIXER FOR PRODUCING FLUENT SUBSTANCES

Frederick J. Osius, Miami Beach, Fla.

Application March 13, 1937, Serial No. 130,777

10 Claims. (Cl. 259—108)

The present invention relates in general to improvements in the art of mixing fluent substances, and relates more specifically to an improved method of and apparatus for disintegrating, mixing and aerating materials to produce palatable and beneficial drinks or the like.

It is quite a simple matter to stir or otherwise agitate several liquids in order to produce an ordinary mixture, but when it is attempted to mix pulpy or fibrous materials with a liquid to produce a mechanical mixture, the problem becomes far more difficult. While the drink mixers heretofore proposed are capable of producing a mixture of ordinary liquids, they cannot be effectively utilized to produce a suitable mixture of ingredients such as fresh fruits and vegetables with each other or with fluent materials such as finely divided powder and liquid, in order to create a uniform and creamy fluent mixture. These prior commercial drink mixers are not adapted to properly disintegrate solid constituents having a pulpy or fibrous structure, and they are furthermore unable to aerate a thick or semi-fluent mixture of materials. The prior devices of this kind are also slow in operation and relatively unsanitary in use, and in view of their limited range of usefulness, the prior drink mixers may be classed as a relatively expensive and inefficient luxury.

It is an object of the present invention to provide a simple and highly efficient method of disintegrating, mixing and aerating various solid and fluent substances to produce a homogeneous and creamy mixture, together with improved apparatus for effecting rapid and thorough exploitation of the improved method.

A more specific object of the invention is to provide an improved process of and apparatus for producing mixed drinks or the like from solid and fluent initial ingredients, which obviate all of the defects of the prior drink mixers and greatly increase the range of usefulness of devices of this kind.

Another specific object of the invention is to provide a new and useful drink mixer which is adapted to rapidly and effectively convert solids such as fresh fruits, vegetables or yeast, and fluent substances such as fine powder or liquid, into a uniform and creamy mixture thoroughly impregnated with diminutive air bubbles.

A further specific object of the invention is to provide an improved disintegrating and mixing unit which occupies minimum space, which is highly attractive in appearance, and which is conveniently operable by any individual.

Still another specific object of the invention is to provide a drink mixing device which eliminates waste of material, which may be readily maintained in highly sanitary condition at all times, and which may be conveniently transported from place to place.

Another specific object of the invention is to provide an improved drink mixer especially adapted for soda-fountain, restaurant or household use, wherein a fascinating and thorough mixing action is constantly visible to the operator and to bystanders, when the machine is in operation.

A further specific object of the invention is to provide mixing apparatus all moving parts of which are concealed and protected, and the various parts of which are readily accessible for cleaning, inspection and operation.

Still another specific object of the invention is to provide improved mechanism for effecting starting and stopping of a drink mixer of the electrically actuated type, and for preventing rotation of the mixing receptacle.

Another specific object of the invention is to provide various improvements in the details of construction and operation of drink mixers, whereby the cost of production thereof is reduced to a minimum while the efficiency and utility is enhanced to a maximum.

These and other objects and advantages will be apparent from the following detailed description.

A clear conception of embodiments of the several features constituting the present invention, and of the mode of constructing and of operating drink mixers built in accordance with the improvement, may be had by referring to the drawings accompanying and forming a part of this specification in which like reference characters designate the same or similar parts in the various views.

Fig. 1 is a vertical sectional view through a drink mixer constructed in accordance with my invention;

Fig. 2 is a section on line 2—2 of Fig. 1;

Fig. 3 is an enlarged sectional view through the cutter-impeller mounting;

Fig. 4 is a section on line 4—4 of Fig. 1; and

Figure 5:
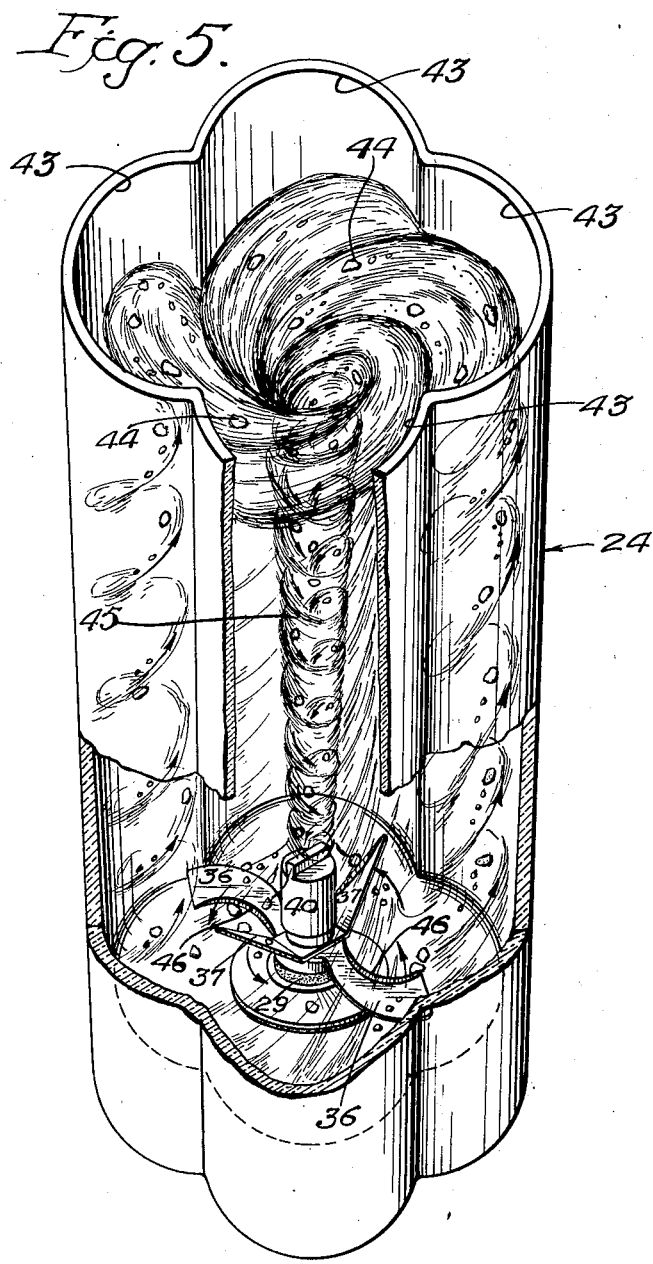
Fig. 5 is a perspective view partially broken away of the container or mixing chamber showing the action set up by operation of the cutter and impeller members.

Referring now more particularly to the drawings, the numeral 10 generally designates a hollow base within which is arranged a vertically-disposed motor 11, the casing of which has a horizontal flange 12 connected by screws 13 to an inwardly-extending flange adjacent the upper end of the casing. The upper end plate of the motor further includes a vertically-extending annular flange 14, and mounted upon this end plate within the flange is a snap switch 15. Rotatably mounted upon the flange 14 is a receptacle support 16 having a plurality of upstanding prongs 17 the purpose of which will presently appear. Upon the lower surface of this support a pair of spaced depending flanges or tappets 18 are provided which extend to opposite sides of the tumbler 19 of switch 15, a bearing sleeve 20 surrounding the tumbler head to reduce friction from engagement with the flanges. The shaft of motor 11 projects upwardly through a central opening 21 in the support, this opening being preferably provided with a floating bushing 22 to seal the space between the shaft and support.

Switch 15 comprises a control for use in starting and stopping the motor, and it will be obvious that by oscillating support 16 this switch may be actuated for this purpose. A speed control switch 23 may likewise be provided, if so desired.

The receptacle utilized comprises lobular, transparent side walls 24 and a bottom 25 of the same material having an opening 26. This opening receives a bearing socket 27 which is clamped to the bottom wall about the edges of opening 26 and sealed thereto through suitable gaskets 28. Within the socket is arranged a bearing 29 receiving a shaft 30. This shaft has a hub 31 at its lower end socketed to provide, with the co-acting upper end 32 of motor shaft 33, a quick-detachable coupling enabling the receptacle to be instantaneously installed or removed. The upper end of the hub is slightly rounded, as indicated at 34, and bears against the lower end of bearing 29 which is of the oilless type and formed of a not-too-dense material for a purpose presently to appear. Seated upon the upper end of the bearing about a squared portion of shaft 30 is a washer 35 having a rounded lower face contacting the upper end of the bearing. Above this washer on the shaft are disintegrating and impelling blades 36, 37, the blades 36 being horizontally arranged and disposed adjacent the lower surface of the receptacle while the blades 37 incline upwardly and outwardly.

Seated upon the upper unit comprising blades 37 is a cup 38 forming a seat for a spring 39, this cup co-acting with a nut 40 threaded upon the upper end of shaft 30 as at 41 and having a depending flange 42 fitting about the outer wall of cup 38 to form a housing for the spring. It will be seen that spring 39 will serve to cause the washer 35 and hub 31 to engage their rounded surfaces solidly with the bearing, thus effecting an efficient seal preventing escape of liquid contents from the container.

While both blades 36 and 37 act as cutting and impelling blades, the blades 36 have as their primary function the impelling action while the primary function of the blades 37 is that of disintegrating solids with which they come in contact. The lobes 43 of the side wall are smoothly arcuate and substantially semi-circular in form being defined in all horizontal planes by arcs of circles which are substantially tangential to the axis of the receptacle, as may be readily determined by an inspection of Figs. 4 and 5 preferably, four in number, being so arranged as to fit between the upstanding prongs 17 of the support 16 and thus prevent relative rotation of the support so that operation of the motor may be instituted either by grasping and rotating the glass or grasping and rotating the support itself.

The operation, when the motor is actuated, is shown in Fig. 5. The rapid rotation of the blades by the relatively high speed motor causes the material to move rapidly upwardly and outwardly in a spiral, throwing the contents radially against the curved inner faces of the lobes which, in turn, serve to deflect this material inwardly as at 44 in substantial tangency to a central vortex 45 through which the material returns to the cutting and impelling unit for retreatment thereby. Due to the deflecting action of the lobular side walls, the tendency to form this vortex is very materially increased over that in the ordinary cylindrical receptacle, and the vortex, accordingly, extends in very close proximity to the disintegrating mechanism, with the result that air is drawn deeply into the material under treatment and agitated therein through the cutting and impelling mechanism. Furthermore, the vortex tends to deliver the heavier materials in such fashion that they pass directly through the whirling upper blades of the unit for treatment thereby. The lower blades tend to prevent collection of any material at the bottom and to further assist in the cutting action. These lower blades are preferably sharpened only at their upper faces, as at 46, in order that these blades, through their action on fluids contained in the receptacle, may tend also to apply pressure forcing the washer 35 downwardly against the bearing 29 to assist in forming a seal.

Utilizing apparatus of this character, it has been found possible to very rapidly disintegrate raw or cooked fruits, fleshy roots, leafy vegetables and the like, reducing the same to a slurry which has no appreciable particles and which is thoroughly aerated, even such fibrous materials as raw pineapple yielding readily to the treatment.

It has been found in actual practice that with this improved process and apparatus, materials such as hard potatoes can be disintegrated and mixed with liquid in a period of approximately one-half minute to produce a creamy mixture having no appreciable solids therein, and this same result can be accomplished with other materials which cannot be reduced at all in an ordinary drink mixer. Additionally, ice, when added to the material, is rapidly disintegrated and thoroughly commingled with the fluids producing a frappéd mixture in an extremely short time.

From the foregoing description it will be apparent that the improved drink mixer is conveniently manipulable and operable to quickly and effectively disintegrate, mix and aerate solid material and liquid to produce a creamy and delicious final mixture. The lobular construction of the cup is important in that it enhances to a maximum the disintegrating and aerating action since each lobe acts to produce a vortex or whirling mass of mixture which is projected to a greater height along the receptacle wall and therefore produces a more effective and deeper central vortex, than is obtained with a circular cup. The lobular shape of the receptacle also serves to prevent rotation thereof relative to the support 16, and the coaction between the support 16 and the tumbler 19 of the switch, provides simple and effective means for starting and stopping the motor 11. The disposition of the flange 14 within the recess 16a of the support also prevents liquid from entering the switch housing, and all parts of the mechanism are obviously readily accessible for inspection and cleaning. The interior of the receptacle may be cleansed by merely operating the rotor with clean liquid in the cup, and the mixer besides being neat and attractive in appearance, is also compact and easily transportable.

It should be understood that it is not desired to limit the invention to the exact details of construction and operation herein shown and described, for various modifications within the scope of the appended claims may occur to persons skilled in the art.

I claim:

1. In a drink mixer, an upwardly open receptacle having a free central space bounded by lobed side walls, a disintegrating and liquid circulating rotor disposed in the lower portion of said receptacle, a driving shaft for said rotor journaled in and extending through the bottom of said receptacle, a motor having a shaft connectable with said rotor shaft, a support for said receptacle through which the motor shaft extends, means on said receptacle support coacting with the lobed walls of said receptacle to prevent rotation thereof, said receptacle support being mounted for oscillation, and means operated by oscillation of the support for controlling the operation of said motor.

2. In a drink mixer, an upwardly open receptacle having a free central space bounded by lobed side walls, a disintegrating and liquid circulating rotor disposed in the lower portion of said receptacle, a driving shaft for said rotor journaled in and extending through the bottom of said receptacle, a motor having a shaft connectable with said rotor shaft, a support for said receptacle through which the motor shaft extends, said receptacle support being mounted for oscillation, and a switch for starting and stopping the motor actuated by oscillation of said support.

3. In a drink mixer a receptacle having inner side walls comprising a small number of smoothly arcuate substantially semi-circular edge-connected upright lobes a rotor having disintegrating blades movable in close proximity to the lower portion of said walls and means for revolving said blades about the axis of said receptacle in a direction such as to produce an upwardly and outwardly spiralling movement of the contents of the container, whereby the action of said lobes on the contents produces an exaggerated vortex having its apex in close proximity to said cutting blades.

4. In a drink mixer, a rotary motor, a base supporting said motor, a receptacle support mounted on said base for oscillation about the axis of rotation of the motor, a receptacle cooperable with said support, a rotor within said receptacle connectable with said motor, and means for connecting said receptacle to said support to prevent relative rotation between said receptacle and said support, and means to start and stop said motor by oscillation of said support.

5. In a drink mixer or the like, a base, a rotary motor carried by said base, a vertical shaft for the motor projecting from the upper end of the base, a receptacle support mounted on the base for limited oscillation about said shaft, means to start and stop the motor by oscillation of said support, a receptacle removably engaged with said support and having mixing elements therein, detachable coupling means to connect the mixing elements to said motor, and coacting means on said support and receptacle preventing relative rotation thereof.

6. A device as claimed in claim 5 wherein the motor is an electric motor and a snap switch controlling the motor limits oscillation of said support.

7. In a drink mixer, an upwardly open receptacle having vertically lobed side walls the lobes being each defined in all horizontal planes by arcs of overlapping circles which are symmetrically arranged around a central axis and each of which circles passes closely adjacent such axis, and means within said receptacle for circulating liquid in an upwardly spiralling direction along said walls.

8. In a drink mixer, a receptacle having therein a liquid confining space bounded by an annular series of smoothly arcuate lobes, the lobes being each defined in all horizontal planes by arcs of overlapping circles which are symmetrically arranged around a central axis and each of which circles passes closely adjacent such axis, and a disintegrating and fluid propelling rotor disposed within the lower portion of said receptacle at the lower end of said space and rotatable about said axis.

9. In a drink mixer, a receptacle having therein a liquid confining space bounded by an annular series of smoothly arcuate lobes, the lobes being each defined in all horizontal planes by arcs of overlapping circles which are symmetrically arranged around a central axis and each of which circles passes closely adjacent such axis, a disintegrating and fluid propelling rotor disposed within the lower portion of said receptacle at the lower end of said space and rotatable about said axis, and means extending through the bottom of the receptacle whereby said rotor may be connected with a driving motor.

10. In a drink mixer, a receptacle having therein a liquid confining space bounded by an annular series of smoothly arcuate lobes, the lobes being each defined in all horizontal planes by arcs of overlapping circles which are symmetrically arranged around a central axis and each of which circles passes closely adjacent such axis, and a disintegrating and fluid propelling rotor disposed within the lower portion of said receptacle at the lower end of said space and rotatable about said axis, said rotor comprising a pair of horizontal blades operating in close proximity to the base of the receptacle and a pair of upwardly and outwardly inclining blades both said pairs of blades having cutting edges.

FREDERICK J. OSIUS.